July 17, 1962  D. G. GUMPERTZ ETAL  3,044,563
ELECTRONIC CONTROL SYSTEM
Filed April 5, 1954  4 Sheets-Sheet 1
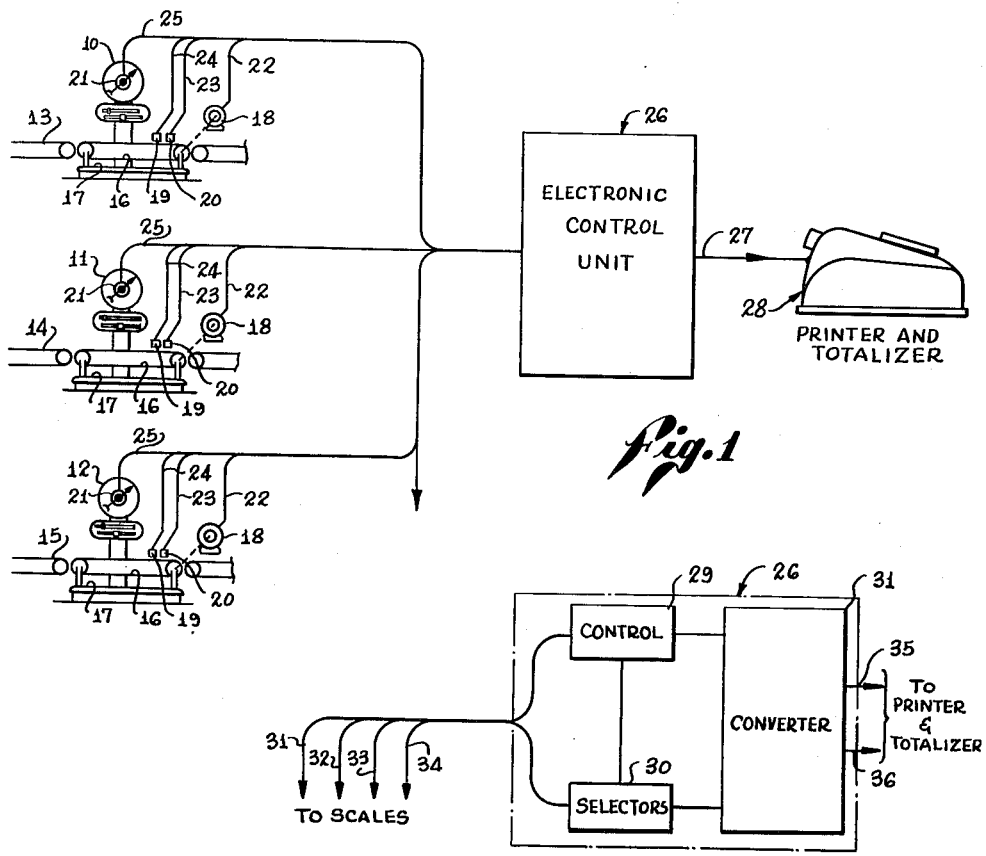
Fig.1
Fig.2
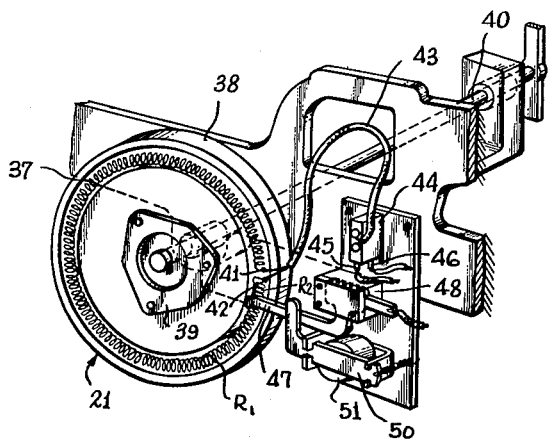
Fig.3
INVENTORS
DONALD G. GUMPERTZ
STUART T. SCHY
BY
Fulwider Mattingly & Babcock
Attorneys July 17, 1962     D. G. GUMPERTZ ET AL     3,044,563
ELECTRONIC CONTROL SYSTEM
Filed April 5, 1954     4 Sheets-Sheet 2
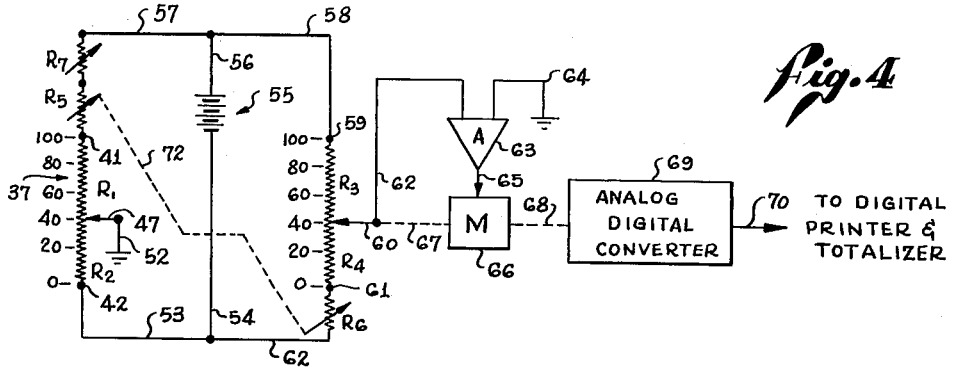
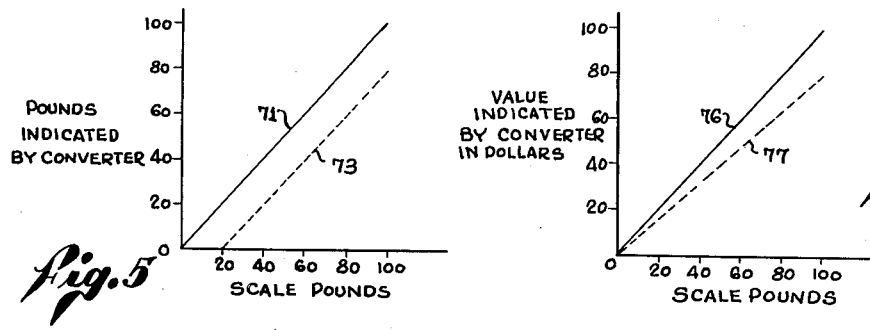
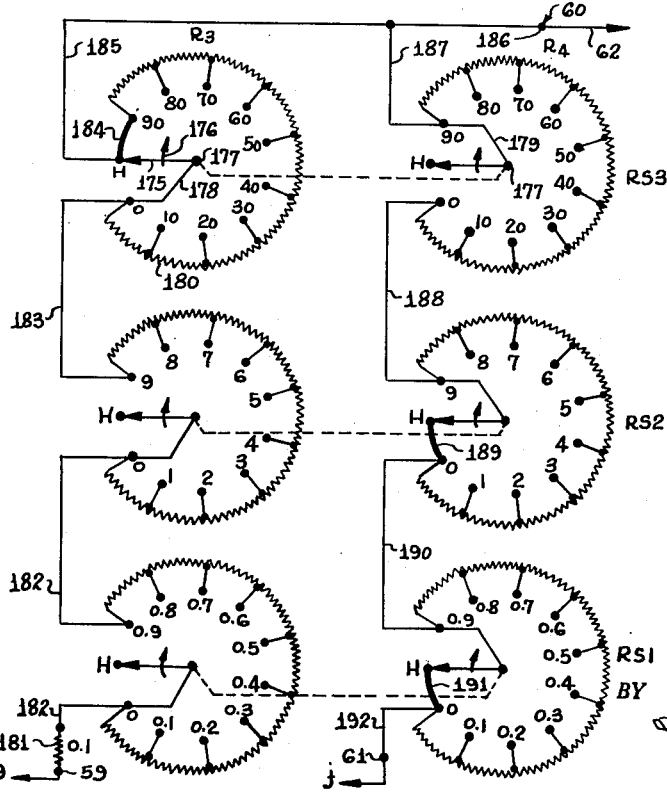
INVENTORS
DONALD G. GUMPERTZ
STUART T. SCHY
BY
Fulwider Mattingly & Babcock
Attorneys

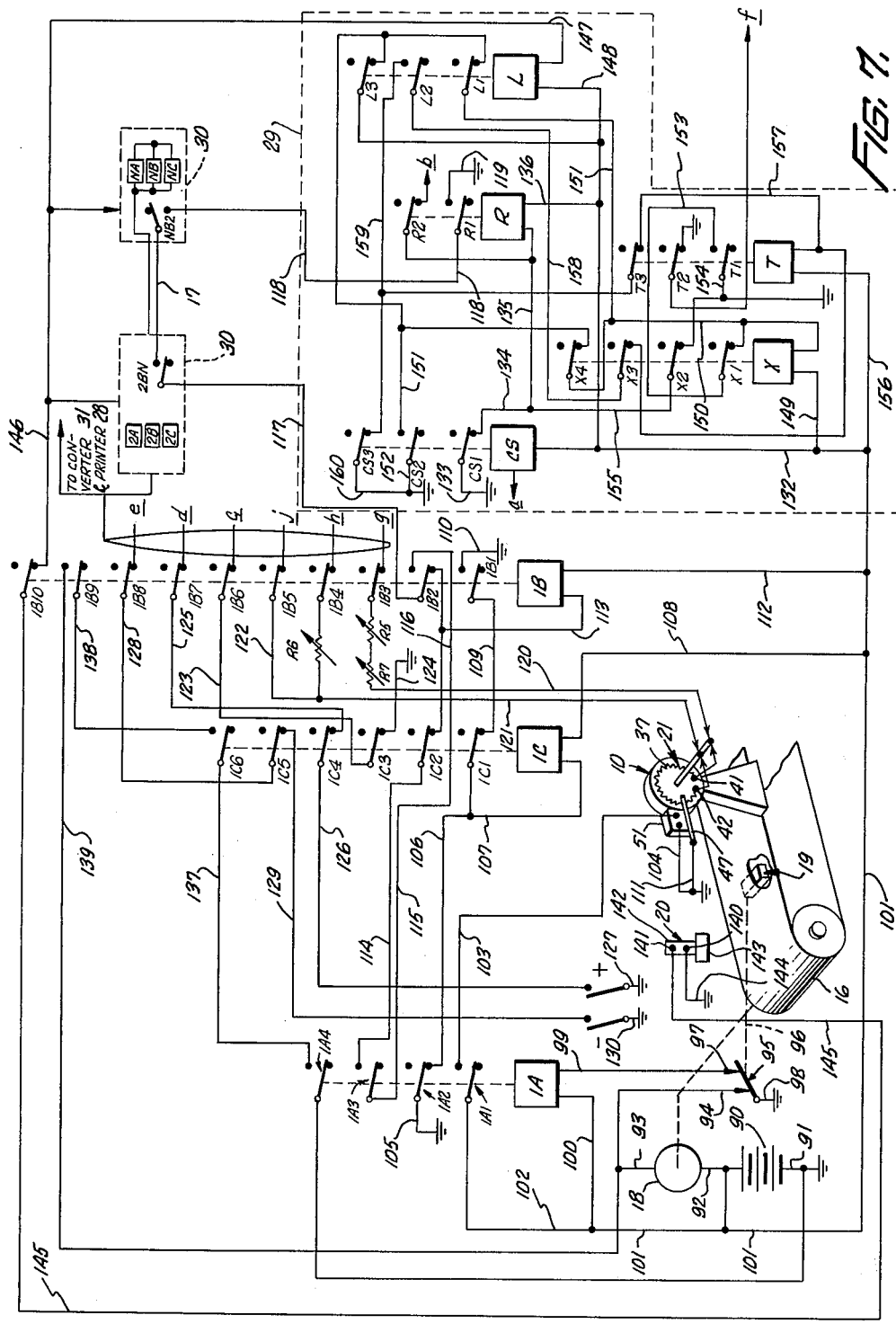

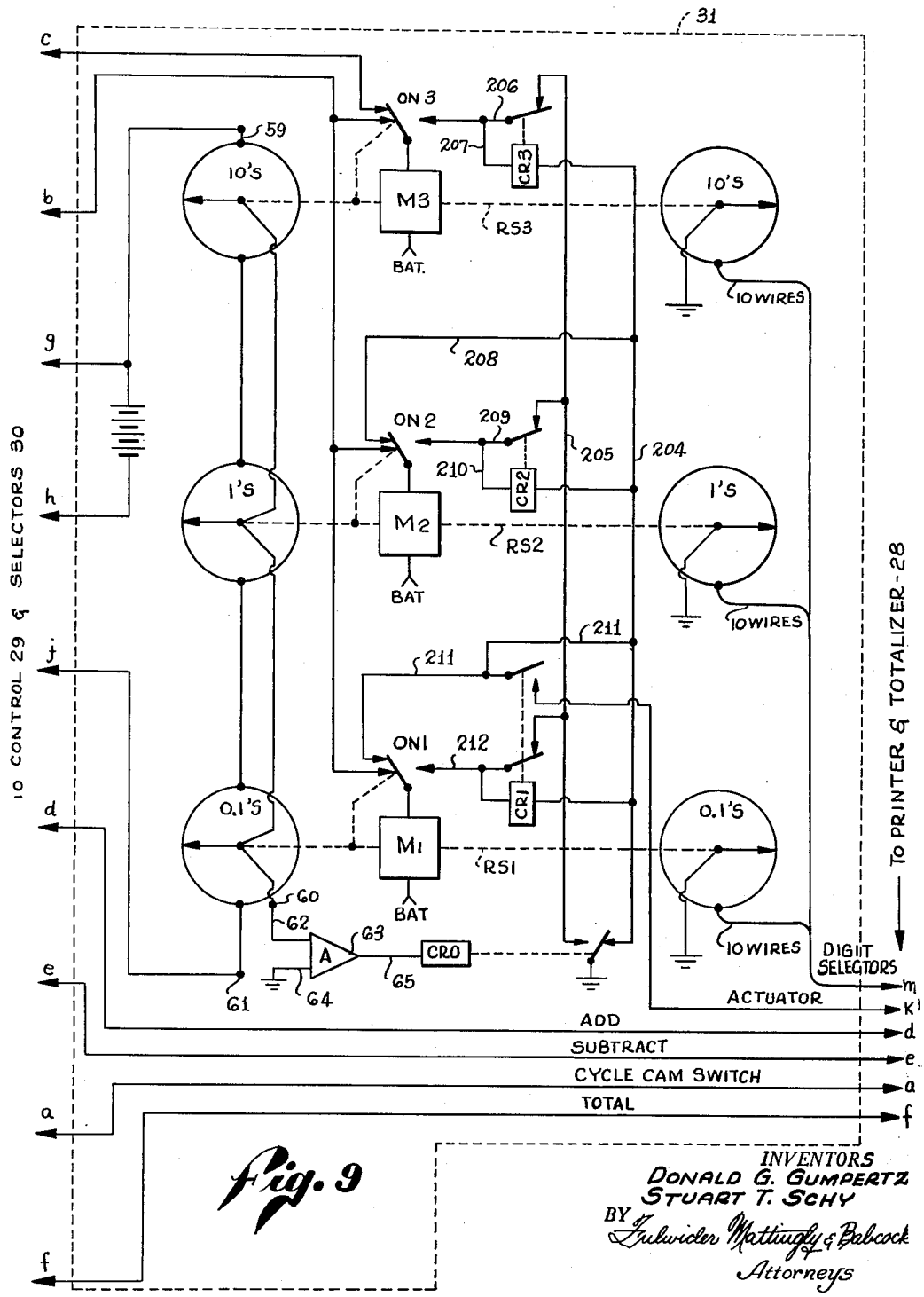

United States Patent Office 3,044,563
Patented July 17, 1962

3,044,563
ELECTRONIC CONTROL SYSTEM
Donald G. Gumpertz, 11953 Hartsook St., North Hollywood, Calif., and Stuart T. Schy, Van Nuys, Calif.;
said Schy assignor to said Gumpertz
Filed Apr. 5, 1954, Ser. No. 421,086
13 Claims. (Cl. 177—3)

This invention relates to systems for automatically measuring and recording information relating to industrial products, and has particular reference to a selective electronic control system for actuating printers or other recording devices to record remotely the results of measurements made with respect to such products. The invention finds particular utility when employed to effect the automatic recording of the weights indicated by one or a plurality of scales utilized in connection with various material handling systems.

In many industries materials of various types are moved from place to place by appropriate handling mechanisms such as chutes, conveyors, belts, or the like. In many cases scales are employed in association with such mechanisms to determine the weight of the materials handled. For example, in packing establishments it is a common practice to use conveyors or the like for bringing into the plant the raw products to be packed and to use scales associated with the conveyors for determining the weight of the raw products so brought in. Similar arrangements are often used for weighing materials moving from place to place within the plant as well as for weighing materials which are moved out of the plant, as for shipment.

In such installations it is the common practice for an employee to manually record (as with pencil and paper) the individual scale readings. The weight records from all scales are then transcribed, tabulated, and (when necessary) totalized. Such a practice is expensive, and errors are unavoidable.

In an attempt to minimize the errors and reduce the cost, various types of printing scales have been developed. Such devices are not entirely satisfactory, are oftentimes inaccurate, and are so expensive that the cost cannot be justified where more than a few scales are used. Furthermore, in some cases the net weight of the material is derived from measurements of the gross weight of the material plus its container and the tare of the container. This requires an arithmetic operation, whether or not a printing scale is utilized, and errors are inevitable.

It is therefore an object of this invention to provide an electronic control apparatus for use with conventional measuring devices which is adapted to operate a printer or other recording device to record permanently the measurements so made.

It is also an object of this invention to provide a control apparatus of the character set forth in the preceding paragraph, which is particularly adapted to record the weight readings of conventional scales.

It is another object of this invention to provide a control apparatus of the character set forth in the preceding paragraphs which is capable of far greater accuracy and speed of operation than has been available in any of the systems employed heretofore.

It is an additional object of this invention to provide a control apparatus of the character set forth hereinabove which includes an automatic selector mechanism for operatively connecting a recorder to each of a plurality of scales as each of such scales is operated, whereby a single control apparatus and recorder may serve a plurality of scales.

It is a still further object of this invention to provide an electronic control apparatus of th character set forth in the preceding paragraph which includes mechanism for totalizing a series of individual weight measurements.

It is another object of this invention to provide an apparatus of the character hereinafter described which includes means for distinguishing in the permanent record the tares from the gross weights.

Another object of this invention is to provide a control apparatus of the character described which includes means for subtracting the tares from the gross weights to thereby record the net weights.

Still another object in an apparatus of the character hereinbefore described is to provide a unique adjusting means for effecting an automatic subtraction of an average or estimated tare from the measured gross weight, thereby providing an adjusted or derived net weight for totalization and recording.

It is still a further object of this invention to provide means for automatically determining the value of quantities of products of known unit price, and including unique adjusting means for automatically indicating and totalizing values proportioned to the quantity or weight and unit price of the goods under consideration.

It is an additional object of this invention to provide an apparatus of the character set forth in the preceding paragraphs which includes control mechanism for connection to the material handling apparatus to so control such apparatus as to minimize the time required for each measurement.

Other objects and advantages of this invention will become apparent from a consideration of the following specification, read in connection with the accompanying drawings, wherein:

FIGURE 1 is a diagrammatic view illustrating, as a preferred embodiment of the system of this invention, an electronic control unit, of a character hereinafter described in detail, as used to so control a printing and totalizing device as to record and totalize the weight readings of a plurality of remotely situated scales;

FIGURE 2 is a simplified block diagram of the electronic control unit illustrated in FIGURE 1;

FIGURE 3 is a fragmentary perspective view of a preferred form of transducer used to convert weight readings of an indicating scale into appropriate electrical signals;

FIGURE 4 is a schematic diagram illustrating the principal functions and operation of the converter unit indicated in FIGURE 2;

FIGURE 5 is a graph useful in explaining the operation of certain of the components shown in FIGURE 4;

FIGURE 6 is another graph similar to FIGURE 5 useful is explaining the operation of still other components shown in FIGURE 4;

FIGURE 7 is a wiring diagram illustrating the apparatus comprising the control and selector devices illustrated in FIGURE 2, and their manner of intercommunication with each other and with each of a plurality of scales and material handling devices;

FIGURE 8 is a wiring diagram illustrating the manner in which rotary switch devices are interconnected to provide a potentiometer of the character illustrated in FIGURE 4; and FIGURE 9 is a diagrammatic representation of a converter circuit embodying a rotary switch type of potentiometer such as is illustrated in FIGURE 8.

Referring now to the drawings which are exemplary of one application of the present invention, FIGURE 1 illustrates a plurality of scales 10, 11, and 12 of conventional type operatively associated with conveyor systems 13, 14, and 15. Each of the conveyor systems 13–15 includes a short conveyor section 16 resting upon the platform 17 of the associated scale and provided with its own independent drive represented schematically by the electric motor 18 in each instance. Each conveyor section 16 is mechanically independent of the remaining portions of the system in order that the weight of the conveyor may be so counterbalanced that the scale dial will read zero after the weight of the conveyor section 17 and auxiliary control apparatus have been taken into account. By this means only additional weight placed on the conveyor 16 will be indicated by the scale 10.

Each of the scale installations includes, in addition to the electric motor 18, a pair of control switches 19 and 20, and a transducer 21 for converting the individual scale readings into representative electrical signals. These four devices (e.g., the electric motor 18, control switches 19 and 20, and the transducer 21) are connected by suitable electrical conductors as represented at 22, 23, 24, and 25, to an electronic control unit 26. The electronic control unit 26 is connected, as indicated diagrammatically at 27, to a suitable electrically operated printer and totalizer represented generally by the reference character 28.

The electronic control unit operates to connect certain control apparatus to any one of the scales 10–12 that has a weight resting thereon and is ready to have the indicated weight recorded, to effect a conversion of the electrical signals received from the transducer 21 into appropriate signals for actuating the printer and totalizer 28, and then, to control the operation of the conveyor section 16 so as to start the goods moving away from the scale as soon as the indicated weight has been determined.

As is represented diagrammatically in FIGURE 2, the electronic control unit 26 comprises a control apparatus 29, a selector system 30, and a converter mechanism 31a, each interconnected wtih the other, the control unit 29 and selector system 30 being connected as indicated at 31, 32, 33, and 34, to each of a plurality of scale assemblies of the character illustrated in FIGURE 1. The converter unit is connected as represented at 35 and 36 to the printer and totalizer as shown in FIGURE 1 at 27.

A preferred form of the transducer 21 is illustrated in FIGURE 3 as comprising an electrical resistance coil 37 suitably supported within a supporting structure 38 which is in turn secured as by means of a spider or like device 39 to the shaft 40 of the scale to which the indicating pointer is attached. Electrical connection to the end terminals 41 and 42 of the resistance coil 37 is effected by means of a pair of relatively long, extremely flexible and lightweight conductors 43 which are terminated on a junction terminal assembly 44 providing terminals 45 and 46 for the attachment of the external wiring.

A contacting finger in the form of a conducting spring strip 47 for engaging the resistance coil 37 is stationarily mounted by means of an insulating bracket 48 on an appropriately positioned portion of the frame 49 of the scale 10. The spring finger 47 is normally spring-biased out of contact with the resistance coil 37 and is arranged to be moved into contact therewith by the overlapping end portion of a movable armature 50 in response to energization of a suitable electromagnet 51.

It will be seen that when the contacting finger 47 is so moved into engagement with the resistance coil 37, it effectively divides the latter into two portions; i.e., a first portion (hereinafter designated R1) extending from the end terminal 41 to the contacting finger 47, and a second portion (hereinafter designated R2) extending from the contacting finger 47 to the end terminal 42.

It will also be seen that since the potentiometer coil 37 is secured by its support 38 and the spider 39 to the scale shaft 40, it will rotate as the scale shaft 40 is rotated. Since the angular position of the shaft 40 is proportional to the weight resting on the scale, the resistance ratio $R1/R2$ is likewise proportional to the weight reading indicated by the scale.

As is explained hereinafter, the contact finger 47 is maintained out of engagement with the resistance coil 37 until the scale comes to rest after a weight is placed on the scale. Then the magnet 51 is energized to bring the contact finger 47 into electrical contact with the resistance coil 37 and thereby establish the division of the resistance coil into the aforementioned portions R1 and R2. By maintaining the contact finger 47 out of engagement with the resistance coil 37 until the scale has reached a balance, errors due to friction which might otherwise be introduced are entirely avoided.

As is indicated diagrammatically in FIGURE 4, the resistance coil 37 in cooperation with the contact finger 47 forms two of the four arms of a self-balancing Wheatstone bridge circuit. To this end the contacting finger 47 is grounded as indicated at 52, one end terminal 42 is connected as by conductors 53 and 54 to one terminal of a floating battery 55, the other terminal of the battery 55 being connected by means of conductors 56 and 57 through variable resistances R7 and R5 to the other terminal 41 of the resistance coil 37. Similarly, the last mentioned terminal of the battery 55 is connected by means of conductors 56 and 58 to one terminal 59 of a potentiometer comprising a resistance R3, R4 having a movable tap 60, the other terminal 61 of the potentiometer R3, R4 being connected to the other terminal of the battery 55 through conductors 54, 62, and variable resistance R6.

The self-balancing type of operation is obtained by use of a servo-mechanism comprising an amplifier 63 to which the movable tap 60 is connected, as indicated at 62, the other input terminal of the amplifier being grounded as indicated at 64. The output of the amplifier 63 is used to control, as indicated at 65, the operation of a driving motor 66 which is mechanically coupled as shown at 67 to the movable tap 60 so as to move the tap 60 up and down the resistance strip R3, R4.

As is well known, a condition of balance obtains in the described Wheatstone bridge circuit when $R3/R4 = R1/R2$, providing R5, R6 and R7 are all set at zero. When the bridge is not balanced, a voltage will appear on conductor 62 having a magnitude and polarity proportional to the amount and direction of the displacement of the movable tap 60 from the balance point at which $R3/R4 = R1/R2$. This potential, after amplification by the amplifier 63, is utilized as indicated at 65 to so control the operation of the motor 66 as to move the movable tap 60 to the bridge balance point.

As a specific example of the operation of the circuit of FIGURE 4, assume that the variable resistances R5, R6 and R7 are all adjusted to zero, that the movable tap 60 is initially positioned at one end of the resistance R3, R4, and that a container of goods is received on the conveyor belt 16 having a weight of 40 pounds. This weight will cause the shaft 40 of the scale to rotate to a position indicating 40 pounds. Let it be further assumed that each of the two sides of the Wheatstone bridge has a resistance of 100 ohms; i.e., $R1+R2=100$ ohms, and $R3+R4=100$ ohms. Movement of the scale shaft to the 40 pound position rotates the potentiometer resistance coil 37 under the contact finger 47 so that when the contact finger is actuated it will ground the resistance coil at the point 40 indicated in FIGURE 4 opposite the contact finger 47. When the device is placed in operation, the movable tap 60 being at one end of the resistance R3, R4, the bridge is unbalanced and a signal will be passed to the motor 66 to move the tap 60 toward the balance point. As the tap moves toward the balance point, the voltage applied to the input of the amplifier 63 gradually reduces, becoming zero when the tap 60 is moved to the point marked 40 in FIGURE 4. At this point $R1/R2 = R3/R4 = 60/40$.

It will be seen that when the bridge is thus balanced, the position of the movable tap 60 with respect to the resistance R3, R4 corresponds exactly to the position of the contact finger 47 with respect to the resistance coil 37. It thus follows that the distance of the tap 60 from the zero end of the resistance R3, R4 is proportional to the weight reading of the scale. Preferably, the motor 66 is of the step motor type, and the number of incremental steps of the tap 60 from the zero end of R3, R4 representative of the weight reading. Accordingly, the motor 66 is coupled as indicated at 68 to a suitable analogue-digital converter 69 which accepts as an input the motion of the tap 60 and converts it into an electrical output of digital character suitable for controlling the operation of the digital printer and totalizer to which the converter 69 is connected as indicated at 70.

It has been found that it is possible to achieve an accuracy of the order of 1 part in 1,000 by using a potentiometer coil 37 which is linear within those limits and by using as the resistance R3, R4 suitably interconnected fixed resistances providing the same overall accuracy. It will be appreciated that in order to achieve such accuracy in the final indication, it is necessary that the motor 66 be operated whenever the bridge is out of balance by as much as one part is 1,000. With such a small degree of unbalance, the potential appearing on conductor 62 is extremely small, thus requiring the use of an amplifier 63 having sufficient overall amplification to deliver an output signal capable of controlling the motor 66 in the manner described.

The use of a bridge of the above type for converting the weight indicated by the scale into an electrical signal not only provides an extremely accurate system, but also permits, in accordance with the invention, various adjustments to be effected in the output signal passed to the printer and totalizer, whereby certain corrections may be automatically incorporated in the system. Two such adjustments dealing with weight and pricing will now be described. These adjustments make use of the variable resistance R5, R6, and R7, and are graphically illustrated in FIGURES 5 and 6.

Referring first to FIGURE 5, there is shown a graph in which the reading in pounds of the scale 10 is plotted as abscissae while the output readings effected by the electrical signals passed to the printer and totalizer are plotted as ordinants. With the variable resistances R5, R6, and R7, all set at zero in the bridge circuit of FIGURE 4, the pounds indicated by the balance point on the converter potentiometer R3, R4 are plotted against the pounds indicated by the position of the finger 47 to produce the straight line 71 passing through the origin as shown in FIGURE 5. If, however, the goods to be weighed were boxed in boxes of identical weight and the net weight of the goods is desired, a constant figure may be subtracted from the gross weight so that the net weight of such goods may be recorded directly. Such an automatic subtraction of the tare weight may be effected by adjustment of the variable resistances R5 and R6 which, for convenience are preferably ganged on a single control as indicated diagrammatically at 72 in FIGURE 4.

To illustrate how this subtraction of a constant value is automatically carried out, assume that each of the containers weighs 20 pounds and contains 20 pounds of goods. The resistances R5 and R6 are then adjusted to insert into the respective left and right hand legs of the bridge resistances corresponding to the tare of 20 pounds. In the example assumed, the bridge resistances were assigned values of 1 ohm per pound, and the resistances R5 and R6 should be adjusted to 20 ohms each. With this arrangement and the 20 pounds of container with 20 pounds of goods (a gross weight of 40 pounds) on the scale, the contact finger 47 will ground the resistance coil 37 at the point marked 40 in FIGURE 4, dividing the left arm of the bridge in such fashion that $$(R5+R1)/R2=80/40$$

To balance the bridge, the tap 60 must be moved to a point such that $R3/(R4+R6)=80/40$, a condition which obtains when the tap 60 is moved to the point marked 20 in FIGURE 4. Thus, with a scale reading of 40, the converter indication is 20 so that the printer will be actuated to print the net weight of 20 pounds, rather than the gross weight of 40 pounds. Thus, the effect of adjusting the resistances R5 and R6, as described, is to provide a calibration such as that indicated at 73 in FIGURE 5 comprising a straight line parallel to the line 71 but passing through the point corresponding to 20 scale pounds at zero pounds indicated by the converter.

In some instances, it may be desired to have the printer record the value of the products weighed rather than their weight. In most instances this may be easily accomplished since the value of the goods is directly proportional to the weight and it is only necessary to modify the printing system to indicate this value. However, once the printing system is fixed to record a value proportional to the number of pounds indicated on the scale, it would not ordinarily be possible to change the reading in the event new unit prices were established, without modifying the recording mechanism. With the provision of the adjusting resistance R7, however, the present invention enables price changes of the above nature to be automatically taken into account without having to modify the printing mechanism.

For example, for the sake of simplicity, assume that the price of the product is $1.00 per pound. If the notation "dollars" is substituted for "pounds" in the printing and recording mechanism, the apparatus of FIGURE 4 will cause the printer to print the same numbers as hereinabove described, the numbers now representing dollars. Such a relationship is represented graphically in FIGURE 6, by the solid line 76 which comprises a graph of the value indicated by the converter in dollars plotted against the scale reading in pounds for a unit price of $1.00 per pound. This is the relationship which exists when the variable resistances R5, R6, and R7 are all set at zero.

Now, suppose that the price of the goods drops to 80 cents per pound. In this event, the resistances R5 and R6 are maintained at zero and only the variable resistance R7 is adjusted to provide a resistance relationship such as that indicated by the line 77 in FIGURE 6 wherein 100 pounds indicated by the scale results in a recorded value of $80.00. It will be apparent that this relationship obtains when the value of R7 is so adjusted that the ratio $(R1+R2+R7)/(R3+R4)$ is the reciprocal of the new price. Thus, for a new price of 80 cents per pound, R7 should be adjusted to a value of 25 ohms.

If it is assumed that R7 is adjusted to this value and a weight of 40 pounds is placed on the scale, the contact finger 47 will contact the potentiometer resistance coil 37 at the point marked 40 in FIGURE 4. The ratio between the resistance arms, i.e. $(R1+R7)/R2$, is now 85/40. The bridge is balanced when $R3/R4=85/40$; that is, when the tap 60 is moved to the 32 ohm point on R3, R4. The appparatus will thus register a value of $32.00 for 40 pounds of goods at the new price of 80 cents per pound.

It will be seen that the two variable resistances R5 and R6 provide a translation of the line 71 of FIGURE 5 to a new location, parallel to the original, as is indicated by the line 75. The adjustment of the variable resistance R7 results, however, in a change in the slope of the line as is indicated by the lines 76 and 77 of FIGURE 6.

It will be appreciated that the control apparatus 29 and selector system 30 of FIGURE 2 operates to establish between the converter 31 and a selected one of the scale installations the necessary electrical connections providing for the mode of operation described with reference to FIGURE 4. The electrical components and circuitry for establishing such interconnection of the apparatus are illustrated in FIGURE 7 which is a schematic wiring diagram. In FIGURE 7, the operating coils of electrical relays are represented by small rectangles within which are inscribed identifying reference characters. The contacts of each relay are identified as being in a certain relay by reference characters corresponding to those assigned to the associated operating coils. That is, each relay consists of a coil and a plurality of contacts. The relays are shown for illustration purposes as double pole relays with the relay circuits in their energized positions. Dashed lines marked with the reference characters 29 and 30, respectively, enclose the apparatus comprising the control apparatus 29 and the selector system 30 of FIGURE 2.

The construction and operation of the control and selector system is best understood by considering the sequence of operations under certain assumed conditions, carrying the description of the apparatus forward as the description of the mode of operation proceeds. Assume, then, as initial conditions, that there is no article on the conveyor section 16 to be weighed by the scale 10. Under these circumstances, the motor 18 is operated to keep the conveyor 16 moving, the motor 18 being energized from a suitable source of power represented as a battery 90, one terminal of which is grounded as indicated at 91, and the other terminal of which is connected by conductor 92 to one terminal of the motor 18. The other terminal of the motor 18 is connected by conductor 93 to a normally closed contact 94 of a switch 95 arranged to be actuated as indicated at 96 by the sensing device 19. The sensing device 19 may comprise a pressure responsive mechanism disposed immediately below the conveyor belt 16 and so arranged as to move the switch 95 to its alternate position and stop the conveyor whenever an article is moved to a position over the pressure sensitive device 19.

The switch 95 includes a second normally closed contact 97 serving normally to ground, as at 98, a conductor 99 which extends to the coil of a first control relay 1A, the other terminal of said coil being connected to the ungrounded terminal of the battery 90 as by means of conductors 100 and 101. Relay 1A has four relay circuits 1A1, 1A2, 1A3, 1A4, each of which comprises a pair of contacts and an armature movable therebetween by the action of the relay 1A. Relay 1A is thus energized until such time as an article is moved to weighing position.

Relay circuit 1A1 of the relay 1A is included in a circuit comprising conductor 102 connected to the supply conductor 101, and a conductor 103 connected to the electro-magnet 51 for actuating the contact finger 47, the other terminal of the magnet 51 being grounded as indicated at 104. Since the relay 1A is normally energized, its contacts 1A1 causes circuit 102–104 to be open, thus de-energizing the electro-magnet 51 so that the contact finger 47 is out of engagement with the potentiometer coil 37.

Relay circuit 1A2 is included in a circuit extending from ground through conductor 105, the contacts of 1A2, and conductors 106 and 107 to the coil of a control relay 1C, the other coil terminal of which is connected to the supply bus 101 by a conductor 108. Relay 1C has six relay circuits 1C1, 1C2, 1C3, 1C4, 1C5, 1C6, inclusive, each of which comprises a pair of contacts and a contact armature movable therebetween by the action of the relay 1C. Relay circuit 1C1 of the relay 1C is included in a circuit extending from conductor 107 through relay circuit 1C1, and a conductor 109 which is connected to one terminal of a relay circuit 1B1 of a relay 1B. Relay 1B has ten relay circuits, 1B1–1B10, inclusive. The other terminal of the relay circuit 1B1 is connected to ground by a conductor 110, so that the electrical circuit through relay circuit 1B1 is completed when relay 1C is energized and relay 1B is de-energized. This circuit serves to maintain relay 1C energized when relay 1B is de-energized, even though the relay circuit 1A2 in circuit 105—106 is subsequently opened.

Assume now that an article is moved by the conveyor section 16 into the weighing position. At this position the pressure sensing device 19 actuates the switch 95 to open at the normally closed contact 94, coupled to the circuit 92, 93, thereby serving to de-energize the motor 18, thus arresting movement of the conveyor when the article is in the weighing position. Actuation of the switch 95 serves also to interrupt at the normally closed contact 97, the circuit energizing the first control relay 1A. Relay 1A is of the unidirectional, time-delay type, providing a substantially instantaneous pickup and a delayed drop-out. It has been found that a delay of approximately three seconds is sufficient to allow the scale 10 to reach a balanced condition. The contact armatures in the relay circuits 1A1–1A4 are switched, on de-energization of relay 1A, three seconds after the article is moved to the weighing position. The switching of the circuit 1A1 completes circuit 102, 103 to the electro-magnet 51, thereby moving the contact finger 47 into engagement with the potentiometer coil 37. As the contact finger 47 is grounded by a conductor 111, the potentiometer coil 37 is grounded at this point of contact. At the same time, the control relay 1C is de-energized by reason of relay circuit 1A2, which is included in the actuating circuit therefor between the lines 105 and 106.

The actuating circuit for relay 1B includes a conductor 112 connecting one terminal of the relay 1B coil to the supply conductor 101, and a conductor 113 connecting the other terminal of the relay 1B coil through relay circuit 1C2, conductor 114, relay circuit 1A3, and conductor 115 to a grounded pickup bus 116. The pickup bus 116 is normally grounded through a series circuit 117 extending serially through a relay circuit 1B2 of relay 1B and like contacts of the second control relay of each of the selectors 30. It will be understood that the selector system includes first, second, and third control relays A, B, and C for each scale installation. In FIGURE 7, the second such scale installation is represented as including control relays 2A, 2B, and 2C, and the last or Nth scale system is indicated as including control relays NA, NB, and NC, it being understood that N represents the last and highest number of a series of such scale installations.

As stated, the series circuit 117 extends through relay circuits —B2 of the second control relays 1B, 2B, 3B . . . NB of all scale installations. From the last such relay circuit, a conductor 118 is connected to a relay circuit R1 of a reset relay R. The other terminal of the reset relay circuit R1 is connected to ground by a conductor 119. It is thus seen that so long as all of the other scales are idle (their control relays 2B, 3B . . . NB de-energized), the control relay 1B, associated with the first scale assembly, is de-energized until relay 1A is de-energized. Relay circuit 1B2 is also connected directly between conductors 113 and 117 and serves to hold relay 1B in an energized condition after energization until released by the reset relay R and independently of subsequent energization or de-energization of the relays 1A and 1C. Relay 1C is held energized when relay 1B is de-energized through the holding circuit consisting of conductor 107, relay circuit 1C1, conductor 109, relay circuit 1B1 and grounded conductor 110.

It is the relay 1B (and the corresponding relays 2B, 3B . . . NB of the other scale assemblies) which serves to establish the necessary connections between the scale and selector system on the one hand and the converter and printer on the other. For example, relay circuits 1B3, 1B4, and 1B5 serve to connect three conductors g, h, and j, respectively, from the converter 31 to the scale potentiometer coil 37, the conductor g being connected through the variable resistances R5 and R7 and conductor 120 to the terminal 41 of the resistance coil 37. Conductor h is similarly connected through variable resistance R6 and conductor 121 to the other terminal 42. Conductor j is connected directly, as indicated at 122, to the conductor 121. As will be explained hereinafter, the conductors g, h, and j serve to connect the resistance coil 37 to the other bridge potentiometer R3, R4 in the converter circuit. A similar function is formed by the corresponding relays 2B, 3B . . . NB in the other scale installations. It will be recognized that because of the series control circuit 117–119, which provides a common path to ground for the relays 1B, 2B, and NB, thus controlling these relays, only one set of such connections can be established at a time.

Relay 1B also serves to establish control connections to the converter 31 and printer 28 by way of conductors c, d, and e. Conductor c is connected through a relay circuit 1B6, conductor 123, relay circuit 1C3, and conductor 124 to ground. Conductor d is connected through a similar circuit comprising relay circuit 1B7, conductor 125, relay circuit 1C4, conductor 126, a manually operated contact maintaining switch (+), and conductor 127 to ground. Conductor e is connected in an identical circuit including relay circuit 1B8, conductor 128, relay 1C5, conductor 129, a manually operated contact maintaining control switch (−), and conductor 130 to ground. The switches (+) and (−) are used to cause the quantity registered by operation of the printer 28 to be designated as a positive quantity or a negative quantity, and control whether the same is to be added or subtracted from any total taken as hereinafter explained. The grounding of conductor c is used to start the motor 66 of FIGURE 4 into operation to balance the bridge.

Since it only requires a pulse of short duration to start the converter circuit in operation, and to preset the functioning of the printer, the circuits just described are arranged to ground the conductors c, and d or e for about one-tenth of a second. This result is achieved by using, for the third control relay 1C, a unidirectional time-delay relay having a substantially instantaneous pickup and a drop-out which is delayed by approximately one-tenth of a second. It will be seen that when relay 1B is energized, the circuit 109 supplying relay 1C is interrupted at relay circuit 1B1. Thus, in each of the circuits 123, 1C3, 124; 125, 1C4, 126, +, 127; and 128, 1C5, 129, −, 130; the relay circuits of relay 1C open one-tenth of a second after relay 1B is energized, so that conductor c and conductors d or e are grounded for the required period.

As will be explained, the converter 31 completes the bridge balancing operation in about one-half of a second, and, upon completion of this operation, energizes the actuator of the printer 28 to cause the printing of the weight measured by the converter 31. The printer 28 is to be understood to include a cam operated switch or similar mechanism which is closed to ground as soon as the printer is started on its cycle of operation. This normally open cam operated contact is connected to a conductor a. Conductor a is connected at its other end to the coil of a cam switch relay CS. The other coil terminal of relay CS is connected to a supply bus 132, which, in turn, is connected to the ungrounded terminal of the battery 90 through supply bus 101. The relay CS is thus maintained energized whenever the printer 28 is actually operating. The cam switch CS has three relay circuits CS1, CS2, and CS3 and is similar to those previously described. One terminal of relay circuit CS1 is connected to ground by a conductor 133, the other terminal of the relay circuit CS1 is connected to one terminal of an energization coil of the reset relay R by way of conductors 134, and 135. The other terminal of the reset relay R is connected, by a conductor 136, to the supply bus 132. The reset relay R is thus energized as soon as the printer begins its cycle of operations. Relay circuit R2 is connected between a conductor 135 and a conductor b which extends to the converter unit 31. As will be explained hereinafter, conductor b is connected to certain "off normal" switches in the converter 31 in such fashion that the conductor b is grounded at the instant the converter is placed in operation and is maintained grounded until the converter completes its operation and is restored to a normal condition ready for another cycle of operation. It will thus be seen that the reset relay R is energized when the printer starts its cycle of operations, and is maintained energized until both the printer 28 and the converter 31 complete their respective cycles of operation.

Energization of the relay R opens the relay circuit R1 between the conductors 118, 119 to de-energize relay 1B. This disconnects the selector 30 and the scale devices from the converter 31 and printer 28. At the same time, a control circuit is completed to energize the conveyor drive motor 18. This circuit extends from the grounded conductor 91 through relay circuit 1A4, conductor 137, relay circuit 1C6, conductor 138, relay circuit 1B9 and conductor 139 to motor conductor 93. Relays 1A and 1C now being de-energized, the de-energization of relay 1B completes the described circuit, thus energizing the motor 18 to start the conveyor 16 and move the article away from the weighing position. As soon as the article is moved away from the pressure sensitive device 19, the switch 95 is restored to the normal position shown on the drawing to complete circuit 99 and energize relay 1A. This, in turn, energizes the relay 1C, as hereinbefore described, and restores the control apparatus to its initial condition, relay 1B remaining de-energized.

If, under the conditions assumed, one of the other scales had been connected to the converter 31 by its control relay (2B, 3B . . . or NB) the pickup bus 116 would be isolated from ground by the opening of the series circuit 117, 118. Under these circumstances, the above-described sequence of operations would continue through the de-energization of the relays 1A and 1C up to the point where the relay 1B would normally be energized. At this point, the cycle of operation would be arrested until the reset relay R was energized to drop the then controlling relay 2B, 3B . . . or NB and until the relay R was then de-energized to re-establish the grounded series circuit 117–119. At this time, the pickup bus 116 would be grounded and relay 1B would then be energized and the cycle of operation would then continue as described.

It will be observed at this point that the selector system described operates to connect the converter 31 and printer 28 to whichever one of the scale assemblies is ready to have a reading recorded. It will be noted, furthermore, that the selector system is so arranged as to be free for operation by any one of the scale assemblies except for the relatively short time the relays 1B, 2B . . . or NB are energized. In other words, the system, as a whole, is not required to wait the three seconds required for the scales to come to balance, nor is it required to wait while the weighed container is being moved out of weighing position. The time of energization of each of the relays 1B, 2B . . . NB during which the system is frozen, is of the order of two-thirds of a second or less, beginning at the time the converter is started in the bridge balancing operation and ending as soon as the printer 28 is started on its cycle of operation. It is to be seen that the system is released for use by other scale assemblies as soon as the printer 28 is placed in operation and is not required to wait until the printing operation is completed.

In the event the total weight of a series or "lot" of articles is desired, means are provided for actuating the printer and totalizer 28 to ascertain and print the total of all of the individually registered weights. This operation is performed after the last box of the lot is weighed and its weight entered. As is shown in FIGURE 7, means for effecting this control comprise the aforementioned control device 20, hereinafter designated the "lot switch." This device preferably comprises a pair of spring fingers 140 and 141 suitably supported as by a bracket 142 and an insulating base 143 in a position to be electrically interconnected by a metal or other electrically conductive tab which is temporarily attached to the last box of a given lot.

The spring 140 is grounded as indicated at 144, so that the interconnection of the fingers 140 and 141 will ground a conductor 145 attached to the spring finger 141. Conductor 145 is connected through normally open contacts of relay 1B10 to a lot bus 146 which serves to connect, in parallel, similar circuits, including the lot switches 20 of each of the scale assemblies. The lot bus 146 is connected, by a conductor 147, to one terminal of a lot relay L, the other terminal of which is connected by conductor 148 to the supply bus 132, so that the relay L is energized whenever any of the lot switches 20 is closed and the corresponding control relay 1B, 2B . . . NB is energized. The lot relay L has four relay circuits L1, L2, L3, and L4.

Energization of the lot relay L is used to ground a conductor f extending to the printer 28 to thereby cause the printer to ascertain and print the total of all items previously printed. Since this total must include the weight of the article then in weighing position, it is necessary that the totalizing operation follow the normal operation in which the weight of the article then in weighing position is registered. In other words, it is necessary to delay the totalizing operation for one cycle of operation of the printer 28. This delay is effected by means of an auxiliary relay X and a totalizing relay T. The auxiliary relay X has four relay circuits X1, X2, X3, and X4, and totalizing relay T has three relay circuits T1, T2, and T3.

The coil of relay X has one terminal connected, by conductor 149, to the supply bus 132 and the other terminal is connected in a control circuit comprising conductor 150, relay circuit L1, conductor 151, relay circuit CS2 and grounded conductor 152, so that the auxiliary relay X is energized as soon as the lot relay L is energized. Energization of relay X establishes a self-holding circuit extending from conductor 150 through relay circuit X1 to conductor 153, relay circuit T1, and conductor 154 to ground.

Relay X is energized only under the conditions that the lot bus 146 is grounded and the cam switch on the printer is in its normally open condition prior to the start of a cycle of operation. It will be further noted that, once energized, the relay X is maintained energized until the holding circuit 153, 154 is interrupted by the energization of the totalizing relay T. Relay circuit X2 is included in a circuit 155 between conductor 135 and ground so as to maintain the reset relay R energized until relay X is released. This prevents operation of the selector relays 2B, 3B . . . NB in any of the other scale assemblies until the totalizing operation is completed.

With the circuit in the condition described, and relay 1B de-energized by the opening of the reset relay contacts R in the series control circuit 118, 119, the lot relay L is de-energized by the consequent opening of relay circuit 1B10 connected to conductor 145 through which circuit the lot bus 146 was grounded. This prepares an energizing circuit for the totalizing relay T, one coil terminal of which is connected as indicated at 156, to the supply bus 132 and the other terminal of which is connected by conductor 157, relay circuit X3, conductor 158, relay circuit L2, conductor 159, relay circuit CS3 and conductor 160 to ground. This circuit will be completed when relay CS is energized at the end of the printer cycle during which the weight of the last article is being printed.

When the first printer cycle is completed and relay CS energized, the circuit 156–160, just described, will be completed to energize relay T. Relay T then establishes a partial self-holding circuit comprising relay circuit T3 connected between conductors 157 and 159. Relay circuit T2 is connected between conductor f and ground so as to supply the actuating pulse to the totalizing mechanism of the printer and totalizer 28.

Relay circuit X4 is connected between conductors 150 and 151 in parallel with relay circuit L1 to maintain relay X energized despite de-energization of relay L and despite energization of relay T until the printer is started on its second and totalizing cycle of operation. When that cycle is initiated, the cam switch relay CS is again energized to open the circuit to relay X between conductors 151 and 152. Deenergization of relay X opens the shunt circuit 155 controlling the reset relay R so that that relay is thereafter controlled by the cam switch relay CS and the previously mentioned "off normal" switches of the converter. The energizing circuit 158 for relay T is also opened so that relay T will be de-energized by the opening of the relay circuit CS3 between conductors 159 and 160 at the end of the totalizing operation.

In connection with FIGURE 4, reference is made to the use of stepping switches or rotary switches as constituting the converter potentiometer R3, R4. FIGURE 8 comprises a circuit diagram illustrating the manner of interconnection of three two-level rotary switches RS1, RS2 and RS3 to constitute a potentiometer of the type so mentioned. Each level of each such rotary switch comprises eleven fixed contacts uniformly spaced around a circle numbered from 0 to 9 inclusive, with the 11th or home contact designated H. Each level includes a wiper 175 arranged to be moved in circular fashion, as indicated by the arrow 176, to connect a wiper terminal 177 to each of the eleven stationary contacts in succession. The two wipers 175 of each switch are interconnected so as to be moved in unison.

In the upper level of each switch (those appearing at the left side of FIGURE 8), the wiper terminal 177 is connected as indicated at 178 to the zero contact, whereas in each lower level the wiper terminal 177 is connected, as indicated at 179, to the 9 contact of each switch. In each switch, fixed resistances 180 are connected between adjacent numbered stationary contacts, nine such resistors being used for contacts 0 to 9 inclusive, and no resistors being connected to the home contact H. If it be assumed, as hereinbefore, that the bridge resistance $R3+R4$ is 100 ohms, then each of the resistances 180 associated with rotary switch RS3 is given a value of 10 ohms. Those associated with RS2 have a value of 1 ohm each, and those associated with RS1 have a value of 0.1 ohm each.

These rotary switches RS1, RS2, and RS3 are interconnected with each other in the manner indicated in FIGURE 8, the upper terminal 59 of R3 (see FIGURE 4) being connected through a fixed resistance 181 (having a value of 0.1 ohm) and conductor 182 to the zero contact of the upper level of rotary switch RS1. The 9 contact of that level is connected by conductor 182 to the zero contact of the upper level of rotary switch RS2, while the 9 contact of that level is connected by conductor 183 to the zero contact of the upper level of rotary switch RS3. The 9 contact of that level is connected by conductor 184 to the home contact H of that level which is in turn connected by conductor 185 to a terminal 186 comprising the movable tap 60 referred to in connection with FIGURE 4.

Terminal 186 is also connected, as by a conductor 187, to the 9 contact of the lower level of rotary switch RS3, the zero contact of that level being connected by conductor 188 to the 9 contact of the lower level of rotary switch RS2. The zero contact of that level is connected by conductor 189 to the home contact H of that level and also by conductor 190 to the 9 contact of the lower level of rotary switch RS1. The zero contact of that level is connected by conductor 191 to the home contact H of that level and also by conductor 192 to the terminal 61 constituting the lower terminal of R4 referred to in connection with FIGURE 4.

In FIGURE 8, the switches are shown in their normal or rest positions prior to the initiation of a balancing operation. By tracing the circuit of FIGURE 8, it will be seen that the upper levels of the switches RS1, RS2, and RS3 (at the left of FIGURE 8), comprise the upper resistance leg R3 of the potentiometer shown in FIGURE 4, whereas the lower levels of the rotary switches RS1, RS2 and RS3 (at the right of FIGURE 8,) comprise the lower resistance leg R4 of FIGURE 4. It will also be seen that with all of the rotary switches in their home positions, as shown in FIGURE 8, R4 will equal 90 ohms and R3 will equal 10 ohms.

The way in which the switches RS1, RS2 and RS3 are actuated to balance the bridge is best understood by assuming a specific example and tracing the operation. Let it be assumed therefore, that a weight of 55.5 pounds is placed on the scale so that the contact finger 47 engages the resistance coil 37 at the 55.5 pound point thus giving R1 a value of 44.5 ohms and R2 a value of 55.5 ohms. Under these circumstances, since initially R3 equals 10 ohms and R4 equals 90 ohms, it is necessary to move the tap 60 in such wise as to increase R3 and reduce R4 to the point where R3 equals 44.5 ohms and R4 equals 55.5 ohms. Since the bridge is unbalanced, the circuit indicated diagrammatically in FIGURE 4, as comprising conductor 62, amplifier 63, conductor 65 and motor 66, will first cause RS3 to rotate in the direction indicated by the arrow 176 and will cause this rotation to continue until R3 becomes greater than 44.5 ohms and R4 becomes less than 55.5 ohms. RS3 will thus rotate until the wiper 75 moves to contact 5; as it does so, the values of R3 and R4 are changed in the following manner:

| RS3 Switch Contact | R3 | R4 |
|---|---|---|
| H | 10.0 | 90.0 |
| 9 | 10.0 | 90.0 |
| 8 | 20.0 | 80.0 |
| 7 | 30.0 | 70.0 |
| 6 | 40.0 | 60.0 |
| 5 | 50.0 | 50.0 |

When RS3 reaches the 5th contact making R3 and R4 both equal to 50 ohms, the balance point has been passed and further rotation of rotary switch RS3 is therefore prevented. In a manner to be described hereinafter, control is transferred to RS2 which is caused to step from its home position H to the 9 contact. This first step of RS2 reduces R3 by 9 ohms and increases R4 a corresponding amount so that R3 is now less than the required value and R4 is greater. This condition of unbalance, being in the same direction as that which caused operation of RS3, causes RS2 to continue to rotate until it also contacts the fifth stationary contact. In so doing, the resistances of R3 and R4 are changed in the following manner:

| RS2 Switch Contact | R3 | R4 |
|---|---|---|
| H | 50.0 | 50.0 |
| 9 | 41.0 | 59.0 |
| 8 | 42.0 | 58.0 |
| 7 | 43.0 | 57.0 |
| 6 | 44.0 | 56.0 |
| 5 | 45.0 | 55.0 |

In moving from the 6th to the 5th contact, the balance point was passed, as may be seen from the above tabulation, with the result that RS2 is arrested at its 5th contact. Control is then transferred to RS1 which is caused to step from its home position to the 9 contact. This operation reduces R3 by 0.9 ohm and correspondingly increases R4. Under these circumstances, R3 is less than that required to balance the bridge and R4 is greater, so that RS1 is caused to continue to rotate until its 5th contact is reached. In so doing, the resistances of R3 and R4 are varied in the following manner:

| RS1 Switch Contact | R3 | R4 |
|---|---|---|
| H | 45.0 | 55.0 |
| 9 | 44.1 | 55.9 |
| 8 | 44.2 | 55.8 |
| 7 | 44.3 | 55.7 |
| 6 | 44.4 | 55.6 |
| 5 | 44.5 | 55.5 |

The above tabulation reveals that when RS1 reaches the 5th contact, the values of R3 and R4 are those required to balance the bridge. Further rotation of RS1 is therefore prevented. With the bridge so balanced, the weight of 55.5 pounds resting on the scale is indicated in decade fashion by the three switches being in correspondingly designated positions. The rotary switches RS1–RS3 are, in themselves, of conventional construction and may be purchased on the open market. Since such switches operate very rapidly (50 to 60 steps per second), bridge balance is achieved in a fraction of a second.

The manner in which the above-described sequential operation of the rotary switches RS1, RS2, and RS3 is obtained is represented in purely schematic form in FIGURE 9. In this figure, the two levels of the rotary switches RS1–RS3 are indicated by a single circle and their previously described manner of interconnection is represented in highly diagrammatic form. The terminals 59 and 61 shown in FIGURE 4 are, however, identified for convenience, as is the movable tap 60 and its connection to the amplifier 63. The amplifier 63 is connected as indicated at 65 to a control relay CR0 arranged, upon energization, to transfer ground from a transfer bus 204 to an operating bus 205.

Since, under the assumed initial conditions described with reference to FIGURE 8, the bridge is unbalanced by reason of R3 being too small and R4 being too large, control relay CR0 will be energized and the operating bus 205 will be grounded. When relay 1B (FIGURE 7) closes, conductor c is grounded momentarily as previously described. This completes the operating circuit for the RS3 stepping motor M3 to cause it to step from the home to the 9 position and transfer the "off-normal" switch ON3 from the position shown to the alternate position connecting M3 to the operating bus 205 through normally closed contacts of a control relay CR3 as indicated at 206.

Motor M3 will be maintained in operation until the bridge balance point is passed, at which time control relay CR0 will be de-energized to transfer ground from the operating bus 205 to the transfer bus 204. This results in the energization of control relay CR3 which interrupts the operating circuit 206 for the motor M3 and establishes a self-holding circuit for relay CR3, such circuit being diagrammatically represented at 207. Relay CR3 thus disables RS3 until the sequence of operations is completed.

At the same time, grounding the transfer bus 204 supplies a start pulse to the motor M2 of the rotary switch RS2 through the off-normal contact ON2. This steps RS2 from its home position to the 9 contact and again unbalances the bridge in the original direction so as to cause the energization of control relay CR0 and the transfer of ground from the transfer bus 204 to the operating bus 205. Motor M2 is thus caused to continue its operation through the off-normal switch OM2 in its off-normal position and through contacts of a control relay CR2 as is diagrammatically indicated at 209. Motor M2 will continue to operate until the balance point is reached, whereupon the resulting deenergization of control relay CR0 transfers ground from the operating bus 205 to the transfer bus 204. As a consequence, control relay CR2 is energized, establishing its own self-holding circuit indicated diagrammatically at 210, and disabling motor M2 until the sequence of operations is completed.

Simultaneously with energization of CR2, grounding the transfer bus 204 applies ground through conductor 211 and off-normal switch ON1 of rotary switch RS1 to cause that switch to step from its home to its 9 position. This operation transfers the off-normal switch ON1 to its off-normal position and, as previously described, unbalances the bridge in the initial direction so as to energize relay CR0 and apply ground to the operating bus 205. The motor M1 is thus caused to continue in its operation by reason of the circuit indicated diagrammatically at 212, as including normally closed contacts of a first control relay CR1. When the balance condition is finally reached, as previously described, control relay CR0 deenergizes removing ground from conductor 205 to stop operation of motor M1 and, at the same time energize control relay CR1. Energization of CR1 opens the circuit controlling the operation of motor M1 to thereby prevent further rotation of rotary switch RS1, and at the same time closes a circuit extending from the then grounded transfer bus 204 through conductor 211 to a conductor $k$ which is connected to the actuating device of the printer 28 so as to start the printer 28 in its cycle of operation.

As soon as the printer 28 starts its cycle of operations, the aforementioned cam switch is closed. The closing of this switch is utilized through circuits of conventional type and not shown in FIGURE 9 to reset the rotary switches RS1–RS3 by again energizing the motors M1–M3, thus continuing rotation of the switch wipers until they reach position.

It will be seen that the described decade arrangement of rotary switches provides a great saving in materials as well as in speed of operation. In contrast, if one were to achieve the same one part per thousand sensitivity by means of a single series of fixed resistances, one thousand such resistances would be required instead of the fifty-five used in the decade arrangement; and instead of the one-half second operating time of the decade arrangement, the serially arranged device would require nearly seventeen seconds.

It will be observed by reference to FIGURE 8, that the number of steps required to drive each of the switches from the balance position to its home position is precisely equal to the digital indication corresponding to the switch position. It is thus within the scope of this invention to utilize the pulsing of the motors M1–M3 to drive appropriate digital computing and tabulating devices. However, a preference is expressed for a somewhat different arrangement which is also diagrammatically illustrated in FIGURE 9.

As represented in FIGURE 9, the rotary switches RS1–RS3 include, in addition to the two levels described with reference to FIGURE 8, a third level indicated diagrammatically at the right hand side of FIGURE 9.

The wipers of each of these levels is grounded, as shown in FIGURE 9, the home contact H is left vacant, and a group of ten wires is connected to each of the ten remaining contacts 0–9. The ten wires from each of RS1, RS2 and RS3 are extended as indicated by the cable $m$ to the individual key operators in each of three columns of the printer 28. Under the assumed conditions where the bridge is balanced with each of the wipers on the fifth position, the number 5 wire in each group of ten is grounded. This energizes the individual digit selectors of the printing device, thus, in effect, depressing the 5 key in each of the three columns so that when the actuator conductor $k$ is grounded, the printer will print 55.5.

Although it has been pointed out hereinbefore that the printer and totalizer 28 may comprise a digital electronic computer or an electromechanical printing device, it is desired to point out further that the control and information signals generated by the electronic control system of this invention may be used equally well to operate card punching machines or tape perforators according to the well known standards for business machine card systems and teletypewriter tape codes. For most installations, however, an electromechanical printer and totalizer is preferred, reference being had to business machines of the type sometimes referred to as adding machines which are electrically powered and arranged for remote electrical actuation of the various keys and controls. One well known make of a machine of this type is that known by the trade name "Clary."

From the foregoing, it will be observed that the selective electronic control system of this invention serves to control the actuation of a printer or other recording device so as to record remotely the results of measurements made with respect to articles, products, and the like, transported by material handling systems such as conveyor belts and the like. It will be noted that the system provides for an extremely fast and accurate operation. The bridge balancing system hereinabove described operates to reach a condition of balance and initiate the recording operation in time not exceeding one-half second.

It will also be observed that the system of this invention is highly flexible and versatile; that a single control system coacting with a single printing device is arranged to serve a plurality of measuring devices such as scales or the like. This is made possible by the unique selection and control system hereinabove described. In connection with the selector system, attention is directed to the fact that the system is arranged to freeze the apparatus for a minimum length of time; that is, only the very short time (less than one second) required to balance the bridge and enter the information into the recording apparatus for printing.

It will be observed that the system is so arranged that the measured quantities may be registered as having either positive or negative values and that the system may be so operataed as to either merely tabulate the measurements or on appropriate signal ascertain and print out the algebraic sum of all entries previously made.

Attention is directed also to the cooperative relationship provided between the electronic control system and the material handling mechanism which provides for the maximum speed of handling the various articles carried by the conveyor system and requires a minimum of time to make and record the desired measurements.

In connection with the use of the system with weighing scales, attention is directed particularly to the provision for inserting an adjustable fixed correction to take into account the estimated or known tare where the products to be weighed are handled in containers of various types, and the somewhat similar provision of an adjusting means allowing weights to be tabulated as values and permitting the unit price to be adjusted as desired.

It will be seen that through the use of a system according to the present invention, it is possible to secure all of the advantages characteristic of automatically printing measuring devices without being subjected to the disadvantages thereof. Through the use of the selector system, the cost of a particular installation is maintained at a minimum. By using the automatic reading and printing mechanism, the possibility of human error is avoided.

While in the foregoing, a specific and preferred embodiment of the invention has been illustrated and described, the invention is not to be limited to the details shown and described, except as defined in the appended claims.

We claim:

1. In an electronic control system for registering at one station measurements made at a plurality of remote locations, the combination of: a measuring device at each of said locations to measure said articles; a transducer means coupled to each of said measuring devices for producing an electrical signal representative of the measurements made by said measuring means; sensing means at each of said remote locations of said measuring means and operably responsive to the presence of an article to be measured for actuating said transducer means; a registering mechanism actuatable to record said measurements; a converter coupled to said registering mechanism for translating said signals and actuating said registering mechanism; a selector system interposed between said converter and each of said transducers and operable to couple any one of said transducers to said converter; and actuating means responsive to operation of each of said sensing means for operating said selector system to couple said converter to the transducer associated with said sensing means.

2. In an electronic control system for registering at one station the weight of articles weighed at a plurality of remote locations each having thereat a scale for weighing said articles, the combination of: a transducer operatively associated with each of said scales and actuatable to produce an electrical signal indicative of the weight indicated by the associated scale; sensing means at each said remote locations operably responsive to the placing of an article on the associated scale for actuating the transducer at said locations; a registering mechanism operable to record said weights; a converter coupled to said registering mechanism for translating said signals and actuating said registering mechanism; a selector system interposed between said converter and each of said transducers and operable to couple any one of said transducers to said converter; and actuating means responsive to operation of each of said sensing means for operating said selector system to couple said converter to the transducer associated with said sensing means.

3. An electronic control system according to claim 2 which includes a lock-out means coupled to all of said sensing means and responsive to operation of said selector system for preventing subsequent operation of said selector system until said registering mechanism is actuated.

4. An electronic control system according to claim 2 which includes a time-delay means for each of said scales interposed between the sensing means and the transducer associated therewith for delaying actuation of said transducer a predetermined time following operation of said sensing means, whereby said scale is permitted to balance before said transducer is operated.

5. An electronic control system according to claim 4 wherein said actuating means is coupled to said time-delay means for operation simultaneously with actuation of said transducer, whereby operation of said selector system is delayed until said scale is balanced.

6. An electronic control system according to claim 5 which includes a lock-out means coupled to all of said sensing means and responsive to operation of said selector system for preventing subsequent operation of said selector system until actuation of said registering mechanism.

7. An electronic control system according to claim 2 wherein said registering mechanism includes a totalizing mechanism operable to add algebraically a plurality of previously recorded weights and record the total thereof and a control device actuatable to operate said totalizing mechanism, said control system including a control means at each of said remote locations for actuating said control device, and means associated with said selector system for connecting to said control device the control means associated with the transducer which is coupled to said converter by said selector system.

8. An electronic control system according to claim 2 which includes manually operable means for selecting the algebraic sign of the weight recorded by said registering mechanism, and wherein said registering mechanism includes means controlled by said manually operable means for recording the algebraic sign so selected.

9. An electronic control system according to claim 7 which includes manually operable means for selecting the algebraic sign of the weight recorded by said registering mechanism, and wherein said registering mechanism includes means controlled by said manually operable means for recording the algebraic sign so selected, whereby said total comprises the difference between the arithmetic sum of the positive weights and the arithmetic sum of the negative weights.

10. An electronic control system according to claim 2 wherein said converter and a transducer coupled thereto comprise a self-balancing Wheatstone bridge.

11. In an electronic control system for registering at one station the weight of articles weighed at a plurality of remote locations each having thereat a scale for weighing said articles, the combination of: a conveyor at each of said locations for transporting said articles onto and off of said scales; a drive means for each of said conveyors; a transducer operatively coupled to each of said scales and actuatable to produce an electrical signal representative of the weight indicated by the associated scale; sensing means at each of said remote locations coupled to the associated transducer and operably responsive to the placing of an article on the associated scale for actuating said transducer; a conveyor control means for each of said conveyors coupled to the associated sensing means and responsive to operation thereof for stopping said drive means; a registering mechanism operable to record said weights; a converter coupled to said registering mechanism for translating said signals and initiating actuation of said registering mechanism; a selector system interposed between said converter and each of said transducers and operable to couple any one of said transducers to said converter; actuating means responsive to operation of each of said sensing means for operating said selector system to couple said converter to the transducer associated with said sensing means; and means operably responsive to the initiation of actuation of said registering mechanism and coupled to said conveyor control means for starting said drive means.

12. An electronic control system according to claim 11 which includes a time-delay means for each of said scales interposed between the sensing means and the transducer associated therewith for delaying actuation of said transducer a predetermined time following operation of said sensing means, and wherein said actuating means is coupled to said time-delay means for operation simultaneously with actuation of said transducer, whereby operation of said selector system is delayed until said scale is balanced.

13. An electronic control system according to claim 12 which includes a lock-out means coupled to all of said sensing means and responsive to operation of said selector system for preventing subsequent operation of said selector system until actuation of said registering mechanism is initiated.

References Cited in the file of this patent

UNITED STATES PATENTS

| | | |
|---|---|---|
| 1,151,146 | Wright | Aug. 24, 1915 |
| 1,298,302 | Davis | Mar. 25, 1919 |
| 1,308,958 | McFell | July 8, 1919 |
| 1,402,934 | Hoepner | Jan. 10, 1922 |
| 1,463,450 | Thomas | July 21, 1923 |
| 1,542,030 | Bristol | June 16, 1925 |
| 1,573,850 | Naiman | Feb. 23, 1926 |
| 1,592,995 | Walker | July 20, 1926 |
| 1,668,073 | Hebden | May 1, 1928 |
| 1,690,679 | Hebden | Nov. 6, 1928 |
| 2,104,546 | Pennell | Jan. 4, 1938 |
| 2,161,879 | Mayher | June 13, 1939 |
| 2,167,517 | Korber | July 25, 1939 |
| 2,202,452 | Hildabrand | May 28, 1940 |
| 2,279,041 | Hadley | Apr. 7, 1942 |
| 2,330,661 | Arey | Sept. 28, 1943 |
| 2,423,540 | Wills | July 8, 1947 |
| 2,610,052 | MacGeorge | Sept. 9, 1952 |
| 2,610,843 | Schellentrager | Sept. 16, 1952 |
| 2,663,203 | Landis | Dec. 15, 1953 |
| 2,684,463 | Wilentchik | July 20, 1954 |
| 2,706,799 | Howe | Apr. 19, 1955 |
| 2,708,368 | Kolisch | May 17, 1955 |
| 2,719,284 | Roberts | Sept. 27, 1955 |
| 2,733,008 | D'Andrea | Jan. 31, 1956 |
| 2,766,981 | Lauler | Oct. 16, 1956 |
| 2,793,849 | Fink | May 28, 1957 |